United States Patent
Derby et al.

(12) 
(10) Patent No.: US 6,302,584 B1
(45) Date of Patent: Oct. 16, 2001

(54) WOVEN POLYPROPYLENE BULK BAG WITH POLYPROPYLENE LINING OR LINER AND PROCESS FOR MANUFACTURING SAME

(75) Inventors: Norwin Ced Derby, Dallas; Craig Alan Nickell, Sherman; Bobby Glenn Brown, Dennison, all of TX (US)

(73) Assignee: Super Sack Mfg. Corp., Dallas, TX (US)

( * ) Notice: Subject to any disclaimer, the term of this patent is extended or adjusted under 35 U.S.C. 154(b) by 0 days.

(21) Appl. No.: 09/671,757

(22) Filed: Sep. 26, 2000

Related U.S. Application Data (62) Division of application No. 09/256,285, filed on Feb. 23, 1999, now Pat. No. 6,179,467, which is a continuation of application No. 08/863,515, filed on May 27, 1997, now abandoned.

(51) Int. Cl.$^7$ .................................................. B65D 30/08
(52) U.S. Cl. .............................. 383/67; 383/107; 383/113; 383/117
(58) Field of Search .................................... 383/107, 111, 383/67, 117, 113

(56) References Cited

U.S. PATENT DOCUMENTS

| | | | | |
|---|---|---|---|---|
| 4,597,102 | * | 6/1986 | Nattrass | 383/107 X |
| 4,781,472 | * | 11/1988 | LaFleur et al. | 383/111 X |
| 5,244,281 | * | 9/1993 | Williamson et al. | 383/67 X |
| 5,649,767 | * | 7/1997 | Nickell et al. | 383/107 X |
| 5,685,644 | * | 11/1997 | Taylor | 383/109 X |

\* cited by examiner

*Primary Examiner*—Jes F. Pascua
(74) *Attorney, Agent, or Firm*—Michael A. O'Neil

(57) ABSTRACT

A woven polypropylene fabric flexible intermediate bulk container ("bulk bag") is formed with a polypropylene lining bonded directly to the material of the fabric, thereby eliminating any possibility of displacement of the lining relative to the bulk bag. An improved discharge chute having an exterior woven polypropylene fabric tube and an interior polypropylene fabric film liver tube may be used in the bulk bag. In a second embodiment, a polypropylene woven fabric tube is positioned around a polypropylene film tube. The tubes are heat sealed circumferentially to each other to form a tubular blank.

1 Claim, 4 Drawing Sheets

WOVEN POLYPROPYLENE BULK BAG WITH POLYPROPYLENE LINING OR LINER AND PROCESS FOR MANUFACTURING SAME

CROSS-REFERENCE TO RELATED APPLICATIONS

This application is a division of application Ser. No. 09/256,285 filed Feb. 23, 1999, now U.S. Pat. No. 6,179,467, which is a continuation of application Ser. No. 08/863,515 filed May 27, 1997, now abandoned.

TECHNICAL FIELD

This invention relates to flexible intermediate bulk containers, commonly known as bulk bags, and more particularly to bulk bags constructed from woven polypropylene fabric having polypropylene linings or liners and to processes for manufacturing the same.

BACKGROUND OF THE INVENTION

Historically, flexible intermediate bulk containers (bulk bags) have been used for receiving, storing, transporting and discharging flowable materials of all types. Bulk bags are typically constructed in square, vertically rectangular, or circular shapes with lift straps attached to each of the uppermost corners of the square, rectangle or circle.

By way of example, flexible intermediate bulk containers are used for handling flowable materials in granular or powder form such as chemicals, minerals, fertilizers, foodstuffs, grains and agricultural products, etc. The advantages of such receptacles include relatively low weight, reduced cost, versatility and, in the case of reusable receptacles, low return freight costs.

At the present time most bulk bags are manufactured from woven polypropylene fabric. Typically, such containers comprise two or more sidewalls and a bottom portion. Optionally, a top wall and lift straps or other lifting members can be added to the basic construction. The traditional method of securing the seams of the several portions of a bulk bag includes sewing or stitching.

Bulk bags are frequently provided with liners, which may be installed either during or after the manufacture of the bulk bag itself. Liners are used to prevent material contained in the bag from sifting through the woven polypropylene comprising the bag and/or through the sewn seams which are used in construction of the bag. Examples of liners for bulk bags are described in U.S. patent applications Ser. Nos. 08/417,898; 08/383,887; and 08/619,419, each assigned to the Assignee of the present application. Liners may also be used to provide bulk bags with improved anti-static, anti-corrosion and/or ant-microbial characteristics. See, for example, U.S. Patent application Ser. No. 08/474,378, filed Jun. 7, 1995 for ANTI-STATIC, ANTI-CORROSION, AND/OR ANTI-MICROBIAL FLEXIBLE COLLAPSIBLE RECEPTACLES and assigned to the Assignee of the present application.

One problem that has long been associated with the use of liners in bulk bags comprises the tendency of liners to move or shift relative to the bulk bag in which they are used. In extreme instances, the discharge of material from a bulk bag may cause a liner disposed therein to pull completely out of the bulk bag through its discharge opening. The problem of liner displacement has been addressed previously; for example, see U.S. Pat. No. 4,597,102 granted to Nattrass on Feb. 24, 1986 and U.S. Pat. No. 4,781,472 granted to La Fleur, et al. on Nov. 1, 1988. However, despite these and other attempts at preventing the displacement of liners relative to the bulk bags in which they are installed, a need exists for still further improvement in the art.

Another problem associated with prior art liners comprises the possibility of dirt and other contaminants sifting through the top or sides of the woven fabric and then collecting between the exterior bag and the impermeable liner. In prior art bags, when the liner contents are discharged the liner collapses because it is not affixed effectively to the exterior bag. As the liner collapses during discharge, the dirt and contaminants collected between the exterior bag and the interior liner may be discharged through the annular space between the bag discharge chute and the liner along with the product being discharged from the liner,. Thus, a need exists for an effective safety seal on the top of the liner to prevent contaminants from being discharged with the produce when the liner is emptied.

Yet another problem associated with prior art bulk bags and liners is their lack of conductivity. Friction that occurs as dry flowable materials are discharged from woven bags tends to cause a significant build up and retention of static electric charge within the receptacle. Discharge of the generated static electric build-up is often difficult if not impossible to control because fabrics are generally not electrically conductive materials. In an effort to address the undesirable characteristics of fabrics, prior art methods have included covering one side of the fabric with a metallic foil-like layer. While adequate in discharging static electric charge, the foil was susceptible to abrasion and tearing through use. Subsequent prior art methods include impregnating the fabric fibers with conductive elements to make the fabric itself conductive. Despite these and other attempts, a need continues to exist for a safe and cost effective solution to the problem of static electric build up in bulk bags.

SUMMARY OF THE INVENTION

Heretofore, bulk bags and the liners used therein have usually been made from different materials. Most frequently, the bulk bag is formed from woven polypropylene fabric and the liner is formed from polyethylene film. The use of different materials for the construction of bulk bags and for the construction of liners to be used therein makes difficult the task of preventing liner displacement. The result has been the above-identified Nattrass patent and Assignee's pending patent applications Ser. Nos. 08/417,898, 08/383,887, and 08/619,419, which disclose a technique of sewing the material of the liner into the sidewall seam of the bulk bag. The above-identified La Fleur patent discloses the use of connectors for securing liners within bulk bags.

In accordance with the present invention, a bulk bag and a liner to be used in the bulk bag are formed from the same polymer. For example, if the bulk bag is formed from woven polypropylene fabric, the liner is formed from polypropylene film. This allows the material of the liner to be bonded directly to the material of the fabric, thereby eliminating the step of sewing the liner material into the sidewall seam of the bulk bag as disclosed in the above-identified Nattrass patent and Assignee's pending applications and, likewise, eliminating the need of connectors secured between the liner and the bulk bag as disclosed in the above-identified La Fleur patent.

It has heretofore been known to provide bulk bags and liner formed from the same material. For example, the assignee hereof has sold woven polypropylene bulk bags having electrically conductive polypropylene liners. However, such liners could not be directly bonded to the bag fabric.

In accordance with one embodiment of the present invention, a polypropylene lining is bonded to a woven polypropylene fabric and a bulk bag is manufactured therefrom. In this manner, any possibility of displacement of the lining relative to the bulk bag is completely eliminated.

In accordance with a first variation of the first embodiment, an improved discharge chute having an exterior polypropylene woven fabric tube and an interior polypropylene film liner tube is inserted in the bulk bag. In this manner, any possibility of displacement of the discharge chute liner relative to the bulk bag and the discharge chute is completely eliminated.

In accordance with a second embodiment of the invention, a polypropylene woven fabric tube is positioned around a polypropylene film tube. The fabric tube and the film tube are heat sealed circumferentially to each other to form a tubular blank. The tubular blank is used to manufacture a bulk bag wherein the woven polypropylene fabric is on the exterior and the polypropylene tube is on the inside of the bag. The circumferential seal prevents displacement of the interior liner relative to the exterior bag and prevents contaminants from being discharged with the liner contents.

In yet another variation of the present invention, the polypropylene liner may be made conductive and thereby used to dissipate static electricity generated when discharging flowable contents from the bulk bag.

BRIEF DESCRIPTION OF THE DRAWINGS

A more complete understanding of the invention may be had by reference to the following Detailed Description when taken in conjunction with the accompanying Drawings in which.

DETAILED DESCRIPTION

Figure 1A:
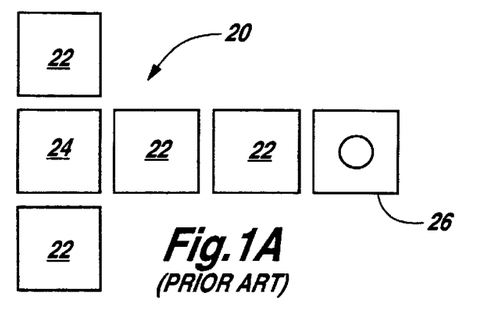
FIG. 1A is an exploded view of a first prior art bulk bag construction.
Figure 1B:
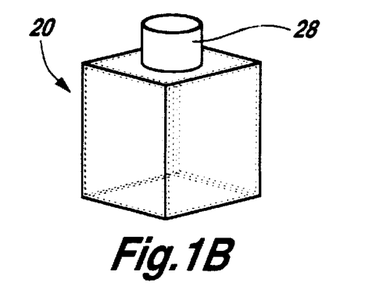
FIG. 1B is an assembled view of the prior art bulk bag of FIG. 1A.

Referring now to the Drawings, and particularly to FIGS. 1A and 1B thereof, there is shown a first prior art bulk bag 20. The bulk bag 20 comprises four side panels 22, a bottom panel 24, and a top panel 26. The panels 22, 24, and 26 are sewn one to the other along all four of their respective edges to form the bulk bag 20. As is best shown in FIG. 1B, the resulting bulk bag 20 is in the form of a cube. As is further illustrated in FIG. 1B and as is well known in the art, the bulk bag 20 may be provided with a top chute 28, a similar bottom chute (not shown), lift loops (not shown) or lift sleeves (nor shown) etc.

Figure 2A:
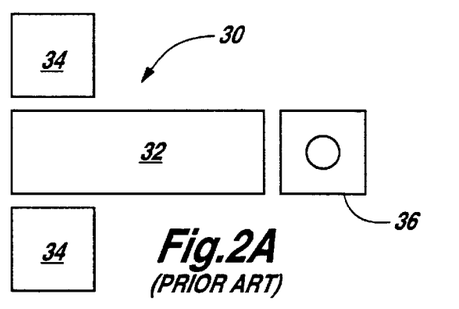
FIG. 2A is an exploded view of a second prior art bulk bag construction.
Figure 2B:
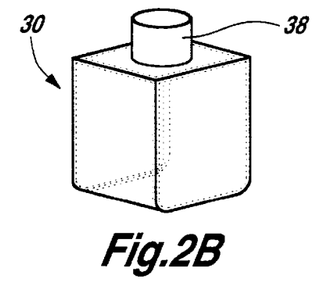
FIG. 2B is an assembled view of the prior art bulk bag of FIG. 2A.

Referring to FIGS. 2A and 2B, there is shown a second prior art bulk bag 30 of the type commonly referred to as a U-panel bag. The bulk bag 30 comprises an elongate U-panel 32 which forms the bottom and two sides of the bulk bag 30, two side panels 34 and a top panel 36. As is illustrated in FIG. 2B, the panels 32, 34 and 36 are sewn together along all four of their respective edges to form a bulk bag which takes the form of a cube. As is further illustrated in FIG. 2B and as is well known in the art, the bulk bag 30 may be provided with a top chute 38, a similar bottom chute (not shown), lift loops (not shown) or lift sleeves (not shown), etc.

Figure 3A:
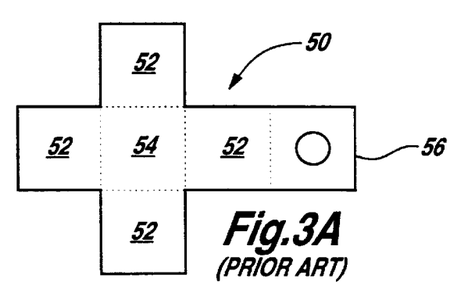
FIG. 3A is an exploded view of a third prior art bulk bag construction.
Figure 3B:
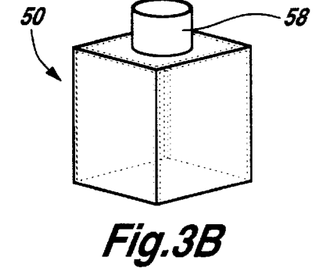
FIG. 3B is an assembled view of the prior art bulk bag of FIG. 3A.

Referring to FIGS. 3A and 3B, there is shown a third prior art: bag 50. The bulk bag 50 is formed from a single piece of material which may be considered as being segregated into side panel portions 52, a bottom panel portion 54 and a top panel portion 56. The bulk bag 50 is completed by joining the side panel portions 52 and the top panel portion 56 one to the other along their respective peripheries, preferably by sewing.

As is illustrated in FIG. 33, the completed bulk baa 50 is in the form of a cube. The bulk bag 50 may be provided with a top chute 58, a similar bottom chute (not shown), lift loops (not shown) or lift sleeves (not shown) etc.

Figures 4, 5:
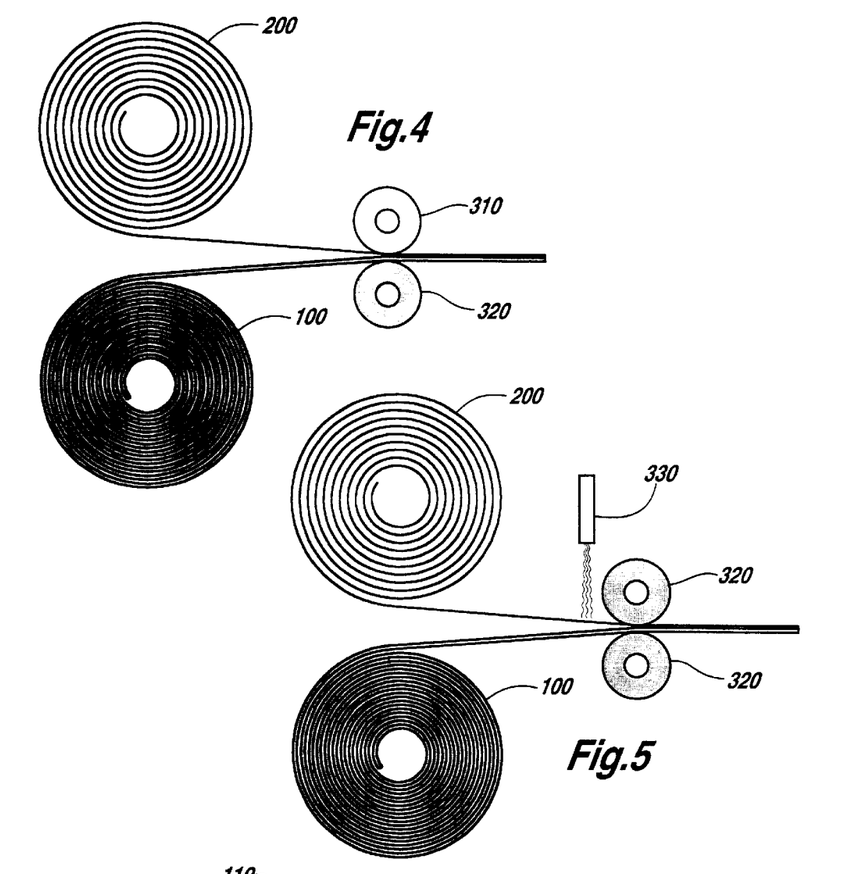
FIG. 4 is a schematic illustration of a method and apparatus for laminating a polypropylene film lining to a polypropylene fabric for use in manufacturing bulk bags in accordance with the first embodiment of the present invention.
FIG. 5 is a schematic illustration of an alternate method and apparatus for laminating a polypropylene film lining to a polypropylene fabric for use in manufacturing bulk bags in accordance with the first embodiment of the present invention.
Figure 6:
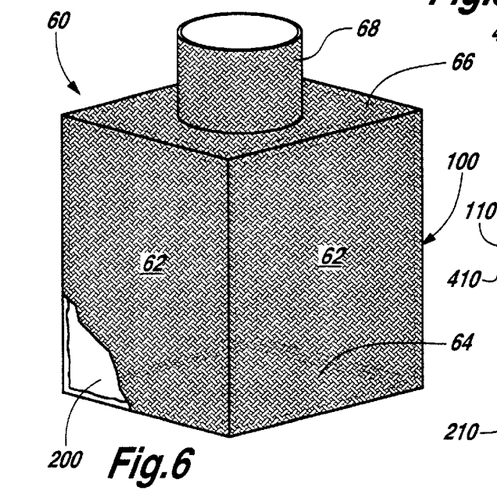
FIG. 6 is a perspective view of a polypropylene bulk bag having a polypropylene film lining manufactured in accordance with the method and apparatus of either FIG. 4 or 5.

Referring to FIG. 6, in accordance with the present invention, a bulk bag 60 may be constructed as illustrated in FIGS. 1–3, or other methods well known in the art, from a woven polymeric fabric having a film lining of the same polymeric material laminated thereto as illustrated in FIGS. 4 and 5. The bulk bag 60 comprises four side panels 62, a bottom panel 64 and a top panel 66. The panels 62, 64 and 66 are sewn one to the other along all four of their respective edges to form the bulk bag 60. Regardless of which of the foregoing constructions is used to fabricate the bulk bag, the present invention comprises the use of a film lining 200 within the bulk bag which is fabricated from the same polymer as is used in the manufacture of the fabric 100 of the bulk bag and which is adapted for direct bonding to the fabric. For example, if the bulk bag is formed from woven polypropylene fabric, then, in accordance with the present invention, the lining used within the bulk bag is formed from polypropylene film. Likewise, if some other polymer is used in the manufacture of the bulk bag, then the same polymer is used in the manufacture of the lining. It will be understood by those skilled in the art that there may be some chemical differences between the compounded polymer used In he fabric and the compounded polymer used in the film Inning or liner used therewith; however, the base polymers will be from the same species, i.e., both polypropylene, or both polyethylene, etc. Therefore, as used hereinafter in this application, the terminology "same polymer" is interpreted to mean a compounded polymer having a base selected from the same species, such as polypropylene, but wherein there may be differences between additives included in the fabric and additives included in the film lining or liner.

The compounded polypropylene used in the formation of the lining or liner of the present invention incorporates increased durability and flexibility over prior art polypropylene compounds which were often characterized as stiff and brittle. The polypropylene of the present invention may include 77% MONTELL KS 353P manufactured by Himont USA, Ind., located in Wilmington, Del. 15% EF601AS resin manufactured by Westlake Polymers Corporation, Houston, Tex.; 4% 10358F resin manufactured by Ampacet Corporation, Terre Haute, Ind.; and 4% 10477F resin also manufactured by Ampacet Corporation.

Referring to FIG. 4, a process for manufacturing the fabric from which the bulk bag 60 is formed is illustrated. A woven polypropylene fabric 100 is laminated to a polypropylene film 200 between a pair of squeeze rollers 310 and 320. A hot roller 310 is positioned adjacent to film 200 and a cold roller 320 is positioned adjacent to fabric 100. Hot roller 310 softens the film 200 sufficiently that it becomes tacky and adheres to the fabric 100. Heat and pressure from the squeeze rollers fuse the film to the fabric. In the preferred practice of the present invention, the hot roller 310 should be positioned adjacent to the film 200 and the cold roller 320 adjacent to the fabric 100 in order to prevent degradation of the fabric strength by heat from the laminating process.

Referring to FIG. 5 therein is illustrated an alternate lamination process of the present invention wherein a hot air source 330 is used to soften film 200 prior to lamination to fabric 100 by passing the adjacent film 200 and fabric 100 between cold rollers 320. Again, heat is preferably applied to the film rather than the fabric.

It is an important feature of the present invention that the manufacturing processes of FIG. 4 and 5 involve heat sealing, also known as bonding, as opposed to laminating which has previously been used to join film to fabric.

Figure 7:
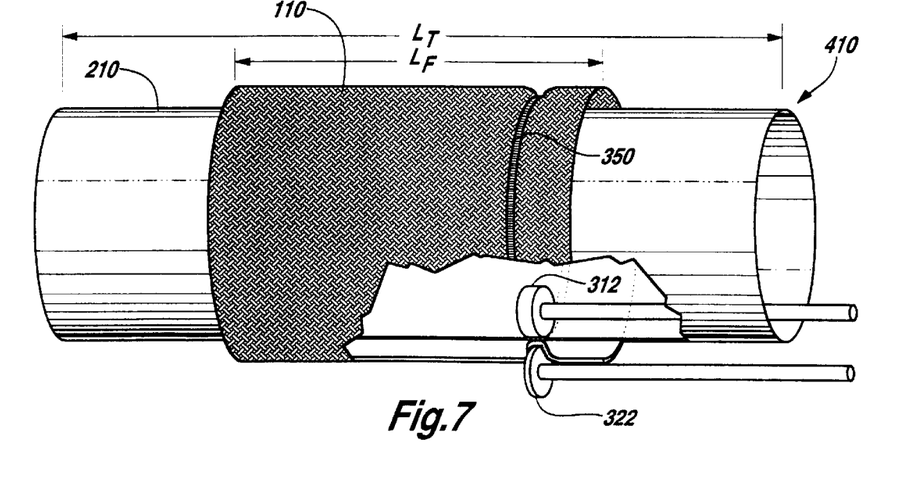
FIG. 7 is a perspective view illustrating a method and apparatus for circumferentially sealing a polypropylene film tube to a polypropylene fabric tune or use in manufacturing bulk bas in accordance with the second embodiment of the present invention.

Turning to FIG. 7, there is illustrated the first step in the practice of a second embodiment of the present invention. A woven polypropylene fabric tube 110 s positioned around a polypropylene film tube liner 210. It will be understood by those skilled in the art that the fabric tube 110 may be formed by seamless continuous weaving or by conventionally seaming one or more rectangular sheets longitudinally to form the tube 110. Likewise, film tube liner 210 may be extruded as a seamless tube or formed from one or more sheets conventionally sealed together to form the tube. In the preferred practice of the present invention, the longitudinal length $L_F$ of the fabric tube is shorter than the longitudinal length of the film tube $L_T$. A first hot squeeze roller 312 is positioned inside film tube liner 210 adjacent to the sidewall and a second cold squeeze roller 322 is positioned outside the woven fabric tube 110 adjacent to the sidewall, wherein the squeeze rollers 312 and 322 are positioned adjacent to one another with the fabric 110 and film 210 therebetween. The squeeze rollers 312 and 322 are rotated concurrently and moved relatively circumferentially around the fabric tube 110 and the film tube 210. Heat and pressure from the rollers 312 and 322 fuse the film tube 210 to fabric tube 110 circumferentially along the seam 350 to form tubular blank 410.

Figure 8:
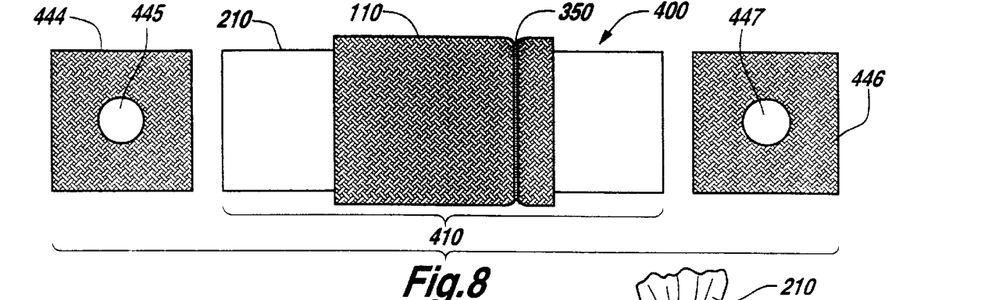
FIG. 8 is an exploded view of a polypropylene bulk bag including a polypropylene liner constructed in accordance with the second embodiment of the present invention.

Referring now to FIG. 8, there is illustrated an exploded plan view of a second embodiment of the present invention. A bulk bag 400 comprises the tubular blank 410, a bottom panel 444 and a top panel 44G. 7n the construction of the bulk bag 400, the tube 110 is joined to the bottom panel 444 and the top panel 446 along the entire peripheries thereof to form the completed bulk bag 400 illustrated in FIG. 9. The bulk bag 400 may be provided with a top chute 450 inserted into opening 445 of top panel 446 and a similar bottom chute 460 may be inserted into opening 447 of bottom panel 444. Lift loops (not shown) or lift sleeves (not shown), as well known in the art, may be provided. As previously noted in the discussion of FIG. 6, the longitudinal length $L_T$ of the film tube liner 210 is longer that the longitudinal length $L_F$ of the fabric tube 110. This permits the film tube liner 210 to extend out of the bag 400 and function as an internal liner.

Figure 9:
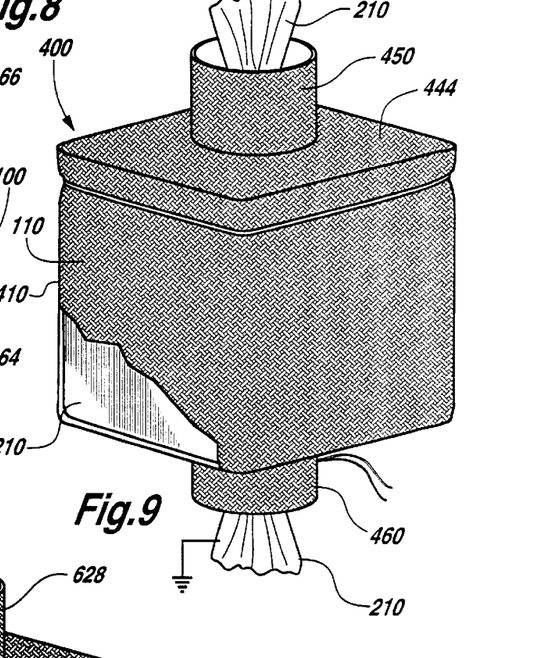
FIG. 9 is an assembled view of the bulk bag of FIG. 8.

Those skilled in the art will appreciate that although the bottom panel 444 and the top panel 446 are illustrated in FIGS. 8 and 9 as being rectangular in shape, the top panel 446 and bottom panel 444 of the bulk bag 400 need not be of any particular shape, and quite frequently are circular in configuration.

It will be understood by those skilled in the art that the film tube liner 210 used in the practice of the present invention may take various forms. The tube may be provided with one or more gussets, as desired. Alternatively, the liner may be shaped into a configuration having an external periphery which closely matches the internal periphery in which the bulk bag will be used. One technique for manufacturing bulk bag liners having predetermined exterior configurations is disclosed and claimed in U.S. patent application Ser. No. 08/429,776, assigned to the Assignee of the present application, the disclosure of which is incorporated herein by reference. Another technique that may be used to form a bulk bag liner having a predetermined exterior configuration is to simply cut a length of film formed from the desired polymer into a plurality of pieces in accordance with a predetermined pattern, and then join the pieces together to form the bulk bag liner utilizing heat sealing, adhesive bonding, or other well-known construction techniques.

The film tube liner 210 used in the practice of the present invention may be provided with one or more internal baffles, if desired. Such a bulk bag liner is disclosed in U.S. patent applications Ser. Nos. 08/417,898; 08/383,887; and 08/619, 419 each assigned to the Assignee hereof, the disclosures of which are incorporated herein by reference. Other techniques for manufacturing bulk bag liners having internal baffles may also be utilized in the practice of the invention, if desired.

The film tube liner 210 is positioned within the bulk bag either during the manufacture of the bulk bag as previously discussed or after the manufacture of the bulk bag has been completed. In either case, the liner 210 is secured in place within the bulk bag by heat sealing. The heat sealing step is carried out in accordance with the teachings of this application by impulse sealing, hot bar sealing, hot die sealing, hot air sealing, RF sealing, band sealing, sonic sealing, flame sealing, or by any of the various heat sealing techniques utilizing apparatus attendant thereto that are currently employed in the industry or which may be hereafter developed.

The heat sealing step securely bonds the material of the liner to the material of the bulk bag. In this manner, any possibility of displacement of the liner relative to the bulk bag is eliminated. Heat sealing may be utilized to secure the material of the liner to the material of the bulk bag at one or more locations which may include at least one location adjacent to the discharge opening, if any, of the bulk bag.

A variation of the second embodiment of the present invention has special applicability for anti-static applications. Prior art patents 4,878,600 and 5,244,281 and pending application Ser. No. 08/474,378, all assigned to the Assignee hereof, the disclosures of which are incorporated by reference,discuss in detail the advantages for incorporating conductive materials in discharge spouts, and bulk bags in general. In this variation, the tube liner 210 is formed from a conductive, flexible polypropylene film. Conductivity can be tailored within a range from about 10 to the 4th ohms per square to about 10 to the 12th ohms per square. Conductivities in the range of about 10 to the 4th ohms per square up to about 10 to the 8th ohms per square are generally considered to be conductive. Liners fabricated from anti-static materials in this range require grounding and are used in the handling of sensitive materials in flammable vapor or gas atmospheres. Conductivities in the range of about 10 to the 8th ohms per square up to about 10 to the 12th ohms per square are generally considered to be dissipative or semi-conductive. Liners manufactured from anti-static materials in this range are suitable for use with flammable powders in nonflammable vapor or gas environments. Conductivities above about 10 to the 13th ohms per square are generally considered to be insulative, and therefore not suitable for the construction of anti-static liners.

In the preferred embodiment, the conductive polypropylene may be compounded from 73% Ampacet 190359 resin manufactured by Ampacet Corporation of Terrytown, N.Y.; 22% EF601AS resin manufactured by Westlake Polymers Corporation of Houston, Tex.; and 5% CAOPEMB 10967 resin also manufactured by Ampacet Corporation. In use, the liner 210 is grounded to safely and effectively drain away static electrical charges.

Figure 14:
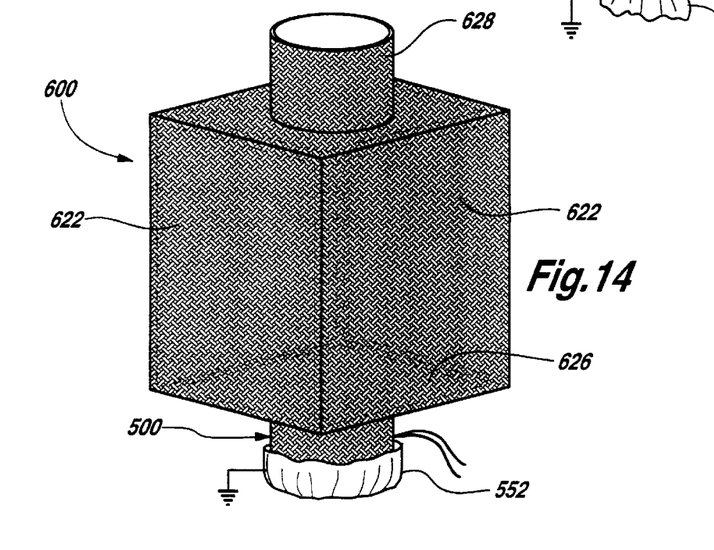
FIG. 14 is a perspective view of a polypropylene bulk bag having a polypropylene film lining manufactured in accordance with the method and apparatus of FIG. 4 and an improved discharge chute having the polypropylene liner of FIG. 13.

Referring now to FIG. 14, there is illustrated a variation of the first embodiment of the present invention. An improved discharge chute 500 is illustrated as being inserted into a bulk bag 600. The bag 600 is manufactured from woven polypropylene fabric having a laminated polypropylene lining formed in accordance with the teachings of FIGS. 4 and 5. The bulk bag 600 may be manufactured in accordance with the teachings of FIG. 6 or other well known methods of fabricating bulk bags.

Figure 10:
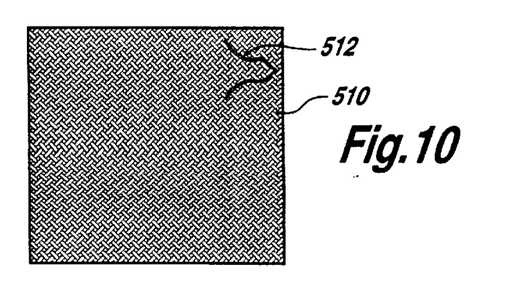
FIGS. 10, 11, 12 and 13 are cross-sectional views of an improved discharge chute having a polypropylene liner.
Figure 11:
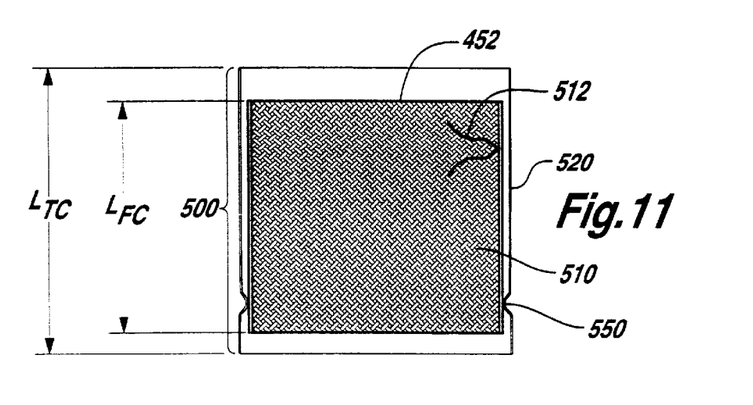

Turning first to FIGS. 10 and 11, therein is illustrated the improved discharge chute 500 comprising a tube of woven polypropylene fabric 510 and a polypropylene film tube 520 of a predetermined diameter sized for insertion into an opening in the bottom 626 of bag 600.

The improved discharge chute 500 provides advantages over prior art lined discharge chutes for bulk bags. Prior art attempts at laminating lining material to a woven fabric discharge tube have been generally unsuccessful because the laminated lining tends to be worn away by the friction of the discharged product, causing the lining to fail and contaminating the product by pieces of the stripped off lining. Similar problems exist with coated linings applied to woven fabric discharge chutes. The present invention avoids such problems because the film tube 520 comprises a continuous sheet of flexible polypropylene that is securely stitched in place to the bottom of bag 600.

The improved discharge chute 500 is manufactured in accordance with the steps illustrated in FIGS. 10–13. The woven polypropylene fabric tube 510 is positioned inside a polypropylene film tube 520. It will be understood by those skilled in the art that the fabric tube 510 may be formed by seamless continuous weaving or by conventionally seaming one or more rectangular sheets longitudinally to form the chute 500. The film tube 520 may be extruded as a seamless tube or formed from one or more sheets conventionally sealed together to form the tube 520. A closure tie 512 is sewn inside chute 500. In the preferred practice of the present invention the longitudinal length $L_{FC}$ of the film tube is longer than the longitudinal length of the fabric tube $L_{TC}$. The film tube 520 is sealed to the woven fabric tube 510 at seal 550 in the same manner as illustrated in FIG. 7.

Figure 12:
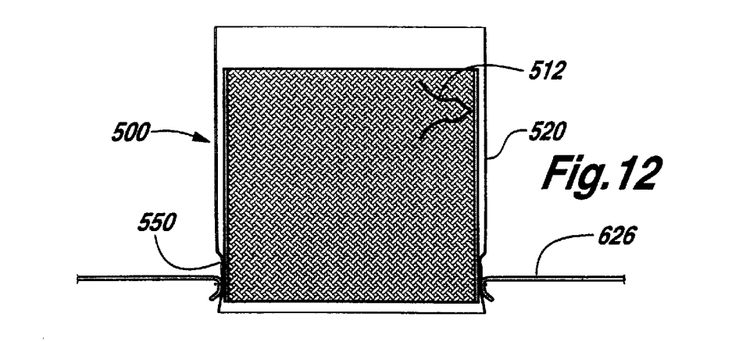
Figure 13:
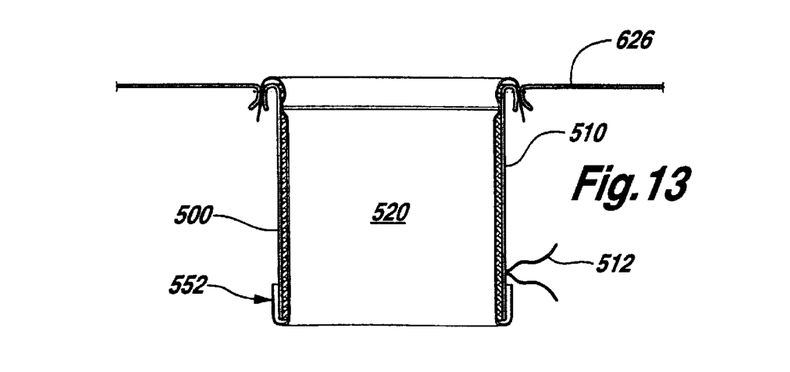

As shown in FIG. 12, the assembled discharge chute 500 is sewn to the inside of bag bottom 626 prior to assembly of bag 500. After the bag 600 is assembled, the discharge chute 500 is pulled through the bottom 626 thereby reversing the position of the film tube 520 from the outside to the inside of the chute 500. The film tube 520 may be turned up in a cuff 552 around the exterior o the fabric tube 510 or allowed to extend down past the fabric tube.

A variation of the improved discharge chute 500 of the present invention has special applicability for anti-static applications. Prior art patents 4,878,600 and 5,244,281 and pending application 08/474,378, the disclosures of which are incorporated herein by reference discuss in detail the advantages for incorporating conductive materials in discharge spouts. This variation is yet another approach to the foregoing problem that provides a safe and cost effective solution wherein the film tube 520 is formed from a conductive and flexible polypropylene. Conductivity can be tailored within a range from about 10 to the 4th ohms per square to about 10 to the 12th ohms per square. Conductivities in the range of about 10 to the 4th ohms per square up to about 10 to the 8th per square are generally considered to be conductive. Discharge chutes fabricated from anti-static materials in this range require grounding and are used in the handling of materials in flammable vapor or gas atmospheres. Conductivities in the range of about 10 to the 8th ohms per square up to about 10 to the 12th ohms per square are generally considered to be dissipative or semi-conductive. Discharge chutes manufactured from anti-static materials in this range are suitable for use with flammable powders in nonflammable vapor or gas atmospheres. Conductivities above about 10 to the 13th ohms per square are generally considered to be insulative, and therefore not suitable for the construction of anti-static discharge chutes.

In the preferred embodiment, the conductive polypropylene may be compounded from 73% Ampacet 190359 resin manufactured by Ampacet Corporation of Terrytown, N.Y., ; 22% EF601AS resin manufactured by Westlake Polymers of Houston, Tex.; and 5% CAOPEMB 10967 resin also manufactured by Ampacet Corporation. The improved discharge chute 500 is manufactured and installed in accordance with the previously described method. The film tube may be grounded in any conventional manner.

Although preferred embodiments of the invention have been disclosed in the foregoing Detailed Description, it will be understood that the invention is not limited to the embodiments disclosed, but is capable of numerous rearrangements, modifications, and substitutions of parts and elements without departing from the spirit of the invention.

We claim:

1. In a bulk bag of the type comprising at least one woven polypropylene side panel having an upper end and a lower end, a woven polypropylene top wall panel joined to the upper end of the side wall panel and having an opening extending therethrough, and a woven polypropylene bottom wall panel joined to the lower end of the side wall panel and having an opening extending therethrough, the improvement comprising:

a tube of polypropylene film having a uniform diameter throughout its length and extending through the opening in the bottom wall panel of the bulk bag, through the interior of the bulk bag as defined by the side wall panel of the bulk bag, and through the opening in the top wall panel of the bulk bag; and a line-type heat seal located substantially downwardly from the upper end of the side wall panel and extending around the entire circumference of the polypropylene tube and joining the polypropylene tube to the woven polypropylene side wall panel.

* * * * *

UNITED STATES PATENT AND TRADEMARK OFFICE
CERTIFICATE OF CORRECTION

PATENT NO. : 6,302,584 B1
DATED : October 16, 2001
INVENTOR(S) : Derby et al.

It is certified that error appears in the above-identified patent and that said Letters Patent is hereby corrected as shown below:

Title page,
Inventors, line 3, replace "Dennison" with -- Denison --.

ABSTRACT,
Line 7, replace "film liver tube" with -- film liner tube --.

Column 2,
Line 14, replace "from the liner,." with -- from the liner. --.
Line 17, replace "with the produce" with -- with the product --.

Column 3,
Line 62, replace "fabric tune or use" with -- fabric tube for use --
Line 63, replace "bulk bas in" with -- bulk bags in --.

Column 4,
Line 22, replace "(nor shown) etc." with -- (not shown), etc. --.
Line 36, replace "art: bag 50" with -- art bag 50 --.
Line 43, replace "FIG. 33" with -- FIG. 3B --.
Line 43, replace "bulk baa 50" with -- bulk bag 50 --.
Line 46, replace "(not shown) etc." with -- (not shown), etc. --.

Column 5,
Line 1, replace "polymer used In he" with -- polymer used in the --.
Line 2, replace "in the film Inning" with -- in the film lining --.
Line 16, replace "Wilmington, Del. 15%" with -- Wilmington, Del.; 15% --.

Column 6,
Line 4, replace "top panel 44G. 7n" with -- top panel 446. In --.

Column 7,
Line 9, replace "reference,discuss" with -- reference, discuss --.

UNITED STATES PATENT AND TRADEMARK OFFICE
CERTIFICATE OF CORRECTION

PATENT NO.    : 6,302,584 B1
DATED         : October 16, 2001
INVENTOR(S)   : Derby et al.

It is certified that error appears in the above-identified patent and that said Letters Patent is hereby corrected as shown below:

<u>Column 8,</u>
Line 14, replace "bag 500.  After the bag" with -- bag 600 .  After the bag --.
Line 18, replace "exterior o the fabric" with -- exterior of the fabric --.

Signed and Sealed this

Ninth Day of April, 2002

Attest:

JAMES E. ROGAN
*Attesting Officer*   *Director of the United States Patent and Trademark Office*